United States Patent
Zavesky et al.

(10) Patent No.: US 11,671,575 B2
(45) Date of Patent: Jun. 6, 2023

(54) COMPOSITING NON-IMMERSIVE MEDIA CONTENT TO GENERATE AN ADAPTABLE IMMERSIVE CONTENT METAVERSE

(71) Applicant: AT&T Intellectual Property I, L.P., Atlanta, GA (US)

(72) Inventors: Eric Zavesky, Austin, TX (US); Louis Alexander, Franklin, NJ (US); David Gibbon, Lincroft, NJ (US); Wen-Ling Hsu, Bridgewater, NJ (US); Tan Xu, Bridgwater, NJ (US); Mohammed Abdel-Wahab, New York, NY (US); Subhabrata Majumdar, Jersey City, NJ (US); Richard Palazzo, Stewartsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/471,155

(22) Filed: Sep. 9, 2021

(65) Prior Publication Data
US 2023/0070050 A1    Mar. 9, 2023

(51) Int. Cl.
*H04N 13/156*    (2018.01)
*H04N 13/189*    (2018.01)
*H04N 13/178*    (2018.01)

(52) U.S. Cl.
CPC ........ *H04N 13/156* (2018.05); *H04N 13/178* (2018.05); *H04N 13/189* (2018.05)

(58) Field of Classification Search
CPC ... H04N 13/156; H04N 13/178; H04N 13/189
USPC ............................................ 348/43
See application file for complete search history.

(56) References Cited

U.S. PATENT DOCUMENTS

| | | | | |
|---|---|---|---|---|
| 5,850,352 A * | 12/1998 | Moezzi | ............... | H04N 13/246 348/E13.058 |
| 10,769,754 B2 * | 9/2020 | Chapiro | ............... | G06T 3/4038 |
| 10,825,481 B2 | 11/2020 | Zavesky et al. | | |
| 11,006,091 B2 | 5/2021 | Liu et al. | | |
| 11,089,281 B2 | 8/2021 | Begeja et al. | | |
| 11,452,929 B2 * | 9/2022 | Hall | ............... | A63B 63/004 |
| 2015/0134668 A1 * | 5/2015 | Popovich | ............ | G06F 16/7867 707/741 |
| 2015/0310043 A1 * | 10/2015 | Adelman | ............... | G06F 16/174 726/5 |
| 2015/0331960 A1 * | 11/2015 | Nickel | ............... | G06F 16/972 715/748 |
| 2022/0311972 A1 * | 9/2022 | McDevitt | ............ | H04N 21/2743 |

* cited by examiner

Primary Examiner — Helen Shibru

(57) ABSTRACT

In one example, a method performed by a processing system including at least one processor includes acquiring a first item of media content from a user, where the first item of media content depicts a subject, acquiring a second item of media content, where the second item of media content depicts the subject, compositing the first item of media content and the second item of media content to create, within a metaverse of immersive content, an item of immersive content that depicts the subject, presenting the item of immersive content on a device operated by the user, and adapting the presenting of the item of immersive content in response to a choice made by the user.

20 Claims, 3 Drawing Sheets

COMPOSITING NON-IMMERSIVE MEDIA CONTENT TO GENERATE AN ADAPTABLE IMMERSIVE CONTENT METAVERSE

The present disclosure relates generally to extended reality (XR) systems, and relates more particularly to devices, non-transitory computer-readable media, and methods for compositing non-immersive media content to generate an adaptable, immersive content metaverse.

BACKGROUND

Extended reality (XR) is an umbrella term that has been used to refer to various different forms of immersive technologies, including virtual reality (VR), augmented reality (AR), mixed reality (MR), cinematic reality (CR), and diminished reality (DR). Generally speaking, XR technologies allow virtual world (e.g., digital) objects from the metaverse to be brought into "real" (e.g., non-virtual) world environments and real world objects to be brought into virtual environments, e.g., via overlays or other mechanisms. Within this context, the term "metaverse" is typically used to describe the convergence of a virtually enhanced physical reality and a persistent virtual space, e.g., a physically persistent virtual space with persistent, shared, three-dimensional virtual spaces linked into a perceived virtual universe. XR technologies may have applications in fields including architecture, sports training, medicine, real estate, gaming, television and film, engineering, travel, and others. As such, immersive experiences that rely on XR technologies are growing in popularity.

SUMMARY

In one example, the present disclosure describes a device, computer-readable medium, and method for enhancing user engagement with extended reality (XR) environments by compositing non-immersive media content to generate an adaptable, immersive content metaverse. For instance, in one example, a method performed by a processing system including at least one processor includes acquiring a first item of media content from a user, where the first item of media content depicts a subject, acquiring a second item of media content, where the second item of media content depicts the subject, compositing the first item of media content and the second item of media content to create, within a metaverse of immersive content, an item of immersive content that depicts the subject, presenting the item of immersive content on a device operated by the user, and adapting the presenting of the item of immersive content in response to a choice made by the user.

In another example, a non-transitory computer-readable medium stores instructions which, when executed by a processing system, including at least one processor, cause the processing system to perform operations. The operations include acquiring a first item of media content from a user, where the first item of media content depicts a subject, acquiring a second item of media content, where the second item of media content depicts the subject, compositing the first item of media content and the second item of media content to create, within a metaverse of immersive content, an item of immersive content that depicts the subject, presenting the item of immersive content on a device operated by the user, and adapting the presenting of the item of immersive content in response to a choice made by the user.

In another example, a device includes a processing system including at least one processor and a computer-readable medium storing instructions which, when executed by the processing system, cause the processing system to perform operations. The operations include acquiring a first item of media content from a user, where the first item of media content depicts a subject, acquiring a second item of media content, where the second item of media content depicts the subject, compositing the first item of media content and the second item of media content to create, within a metaverse of immersive content, an item of immersive content that depicts the subject, presenting the item of immersive content on a device operated by the user, and adapting the presenting of the item of immersive content in response to a choice made by the user.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
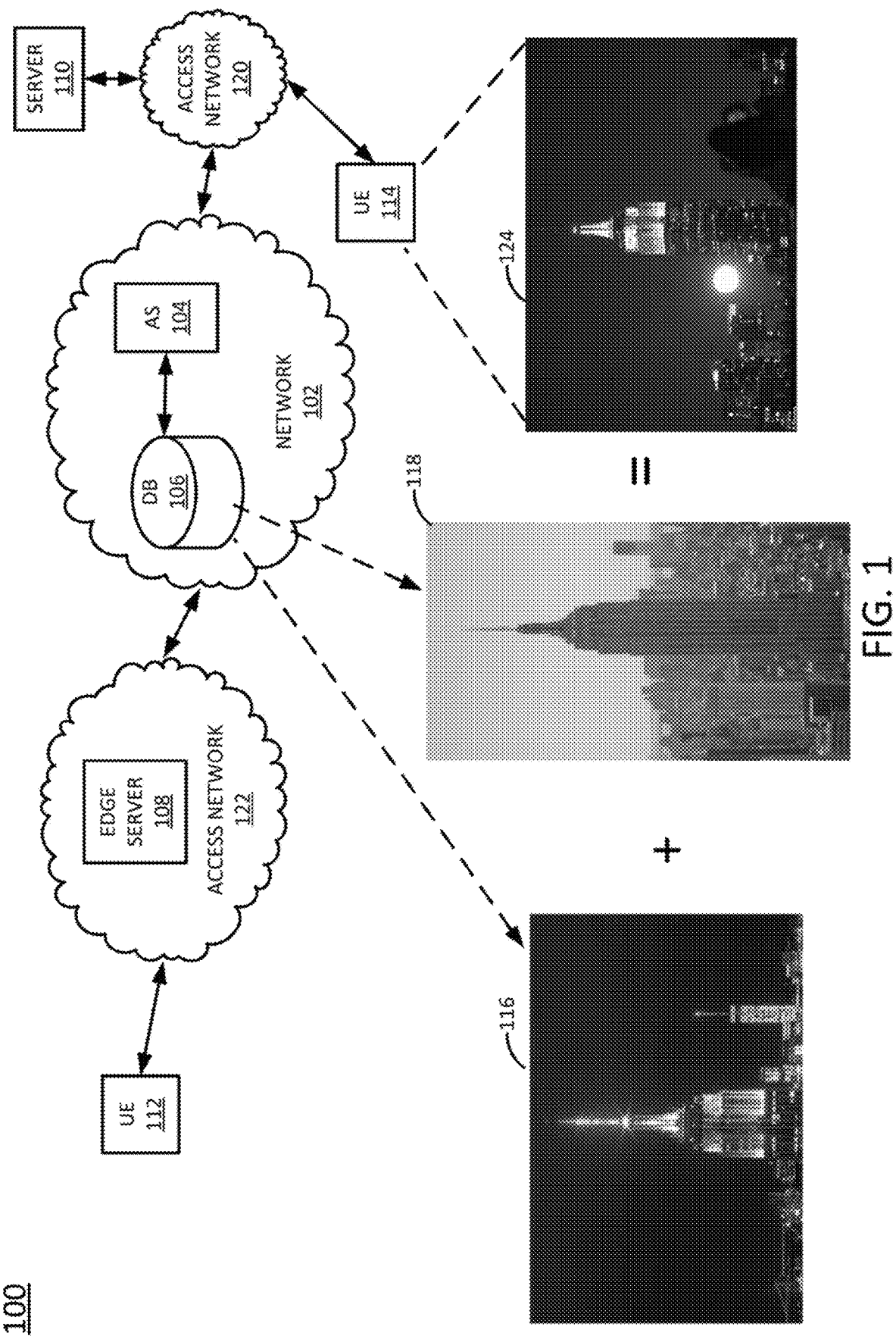
FIG. 1 illustrates an example system in which examples of the present disclosure may operate.

In one example, the present disclosure enhances user engagement with extended reality (XR) environments by compositing non-immersive media content to generate adaptable, immersive content. As discussed above, XR technologies allow virtual world (e.g., digital) objects from the metaverse to be brought into "real" (e.g., non-virtual) world environments and real world objects to be brought into virtual environments, e.g., via overlays or other mechanisms. This creates a more engaging and immersive experience for users. For instance, an XR environment could provide a 360 degree rendering of a famous landmark, allowing a user to feel like they are physically present at the landmark by simply putting on a head mounted display. However, state of the art capture and playback technologies tend to provide relatively static renderings. For instance, when the user "visits" the landmark via the XR environment, the appearance, artifacts, and avatars/interactive elements that are rendered may be static, may be incomplete, or may present brand safety concerns. In other words, the XR environment may simply play back a single metaverse recording of the landmark (e.g., a 360 degree rendering), where the single recording may not account for changes to the landmark over time.

Examples of the present disclosure provide a system that can composite media depicting the same subject from multiple sources to create a new item of immersive content. Compositing of the media may be performed in an automated, intelligent manner that preserves "free choice" in the item of immersive content. In this content, "free choice" refers to the ability of a user to experience the item of immersive content from different perspectives. For instance, at a particular physical location within the item of immersive content, the user may be presented with an option to walk straight, turn left, or turn right. The user may turn left the first time they experience the item of immersive content, but then turn right the next time.

By incorporating data from multiple sources, the immersive content can adapt a rendering of the subject that allows a user to experience the subject at different points in time. Thus, "living" immersive content in the metaverse can be created that evolves over time with changes to the subject of the content. This approach also allows for retroactive refresh of immersive content by businesses or other entities associated with the subject of the content. For instance, if the subject of the immersive content is a famous toy store, the owner of the toy store may provide data to update the depiction of the toy store in the immersive content. The update may involve updating the immersive content to show a new display within the store, to remove intellectual property (e.g., a trademark) that does not belong to the store's owner or an object that might otherwise be undesirable to display (e.g., a toy store customer wearing a shirt with profanity written on it), or to make other changes.

Within the context of the present disclosure, "immersive content" is understood to refer to media content that is designed to make a user perceive that they are physically present in a virtual environment that the immersive content presents. Similarly, content created in "the metaverse" refers to items that are virtual in nature but have a persistent reference to a point (and possibly time) in space that corresponds to a physical instance. In the metaverse, an item (e.g., a rock, a castle, or a likeness of a living being) can exist at only one point (e.g., Oct. 25, 2013 at the steps of the state capitol in Austin, Tex.) or across all points (e.g., at the steps of the state capitol in Austin, Tex. at all times). In another example, the item may have a consistent appearance (e.g., a sign reading "Live Music Capitol of the World" in orange letters), or the item may have a varying appearance (e.g., a sign reading "Silicon Hills" in scrolling light emitting diode lettering). The perception of being physically present in the virtual environment may be created by presenting three-dimensional and/or 360 degree images of the virtual environment and/or by controlling one or more systems in the user's vicinity to generate simulated environmental effects (e.g., raising or lowering the ambient temperature, dimming or brightening the ambient lighting, generating specific sounds, scents, or tactile sensations, and the like).

In further examples, the present disclosure may provide a way to "gamify" life experiences (i.e., applying game design elements and principles in non-game contexts in order to motivate and engage users) using XR technologies. These and other aspects of the present disclosure are described in greater detail below in connection with the examples of FIGS. 1-3.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
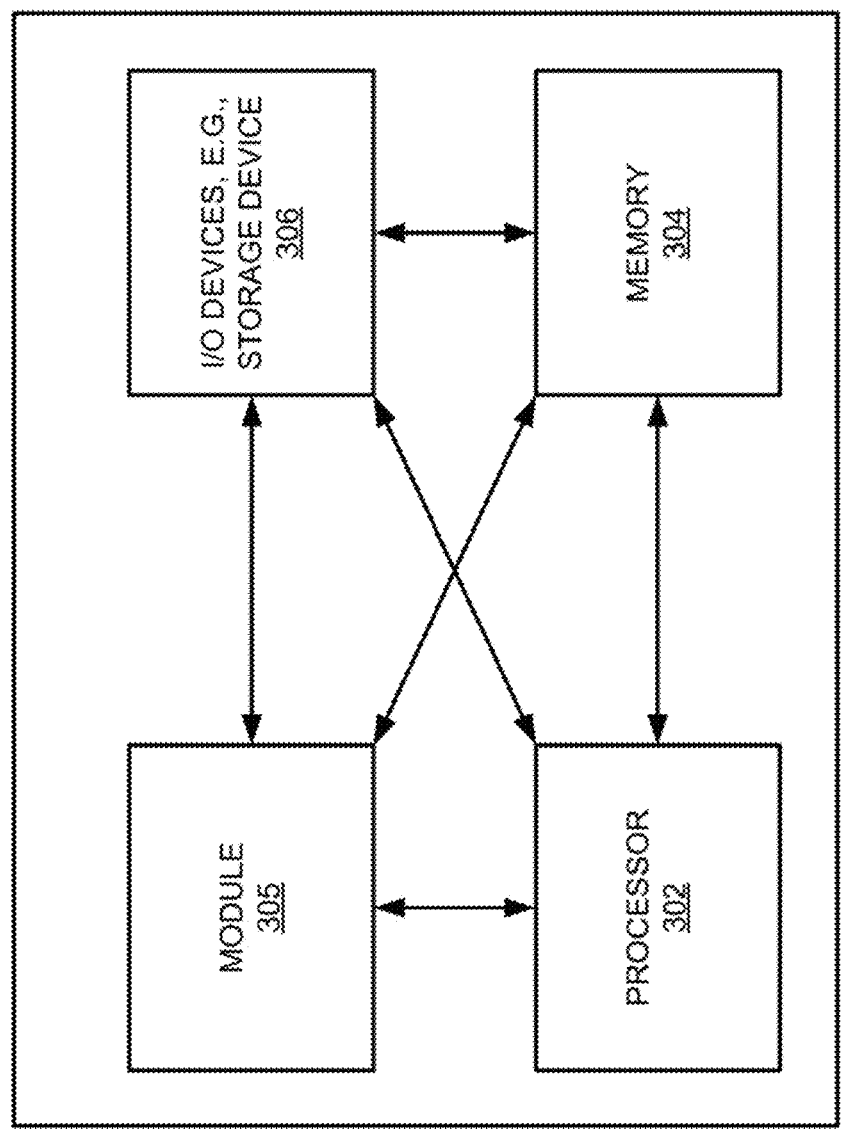
FIG. 3 depicts a high-level block diagram of a computing device specifically programmed to perform the functions described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for compositing non-immersive media content to generate adaptable, immersive content. The network 102 may also include a database (DB) 106 that is communicatively coupled to the AS 104. The database 106 may contain one or more instances of items (e.g., stored internally) or references to items (e.g., stored elsewhere but used in this system) in the metaverse.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) are illustrated, it should be noted that any number of servers may be deployed, and which may operate in a distributed and/or coordinated manner as a processing system to perform operations in connection with the present disclosure. Moreover, it should be further noted that while the present disclosure may at times make explicit reference to the metaverse, the DB 106 may also serve as a stand-alone database, a hybrid database-metaverse combination, or a proxy to metaverse representations and storage.

In one example, AS 104 may comprise a centralized network-based server for generating extended reality environments. For instance, the AS 104 may host an application that renders immersive XR environments which are accessible by users utilizing various user endpoint devices. In one example, the AS 104 may be configured to locate individual items of non-immersive media content which depict a common subject and composite those individual items of media content in order to generate an adaptable, immersive item of media content. For instance, the AS 104 may generate a 360 degree or volumetric video of the subject which a user may explore from a plurality of different perspectives. Furthermore, the AS 104 may adapt the 360 degree or volumetric video with items of media content depicting the subject at different times (e.g., at least a first time and a second time) in order to provide different experiences within the same immersive item of media content. The different times may include times that occurred several years in the past or that occurred during seasons of a year, or events that occurred on different holidays, and the like. The AS 104 may also augment the 360 degree or volumetric video with additional items of non-immersive content which may allow the 360 degree or volumetric video to provide new "branches" or experiences for exploration. Although the examples discussed in the preceding sentences utilize 360 degree and volumetric video as examples, it will be appreciated that the immersive item of media content may comprise other types of immersive experiences as well.

In one example, AS 104 may comprise a physical storage device (e.g., a database server) to store a pool of media content. The pool of media content may comprise both immersive and non-immersive items of media content, such as still images, video (e.g., two dimensional video, three-dimensional video, 360 degree video, volumetric video, etc.), audio, and the like. The pool of media content may include professionally produced content (e.g., films, television shows, commercials, and segments thereof which have been produced by professional studios) as well as amateur content (e.g., content captured by non-professional users, such as personal images, video, and the like). Individual items in the pool of media content may be annotated with metadata to indicate information including date and time of capture, data and time depicted, subject(s) depicted, tone or genre, policies or rules governing re-use, and other information. The pool of media content and the individual items of media content may also include references to the metaverse which specify dependencies on additional items (e.g., a nostalgic photo must be coupled with a nostalgic guitar from the metaverse) or items of media content in the pool of media content may be iconic, persistent items within the metaverse itself (e.g., a historical reference video of the United States Declaration of Independence).

In one example, the DB 106 may store the pool of media content, and the AS 104 may retrieve individual items of media content from the DB 106 when needed. For ease of illustration, various additional elements of network 102 are omitted from FIG. 1.

Figure 2:
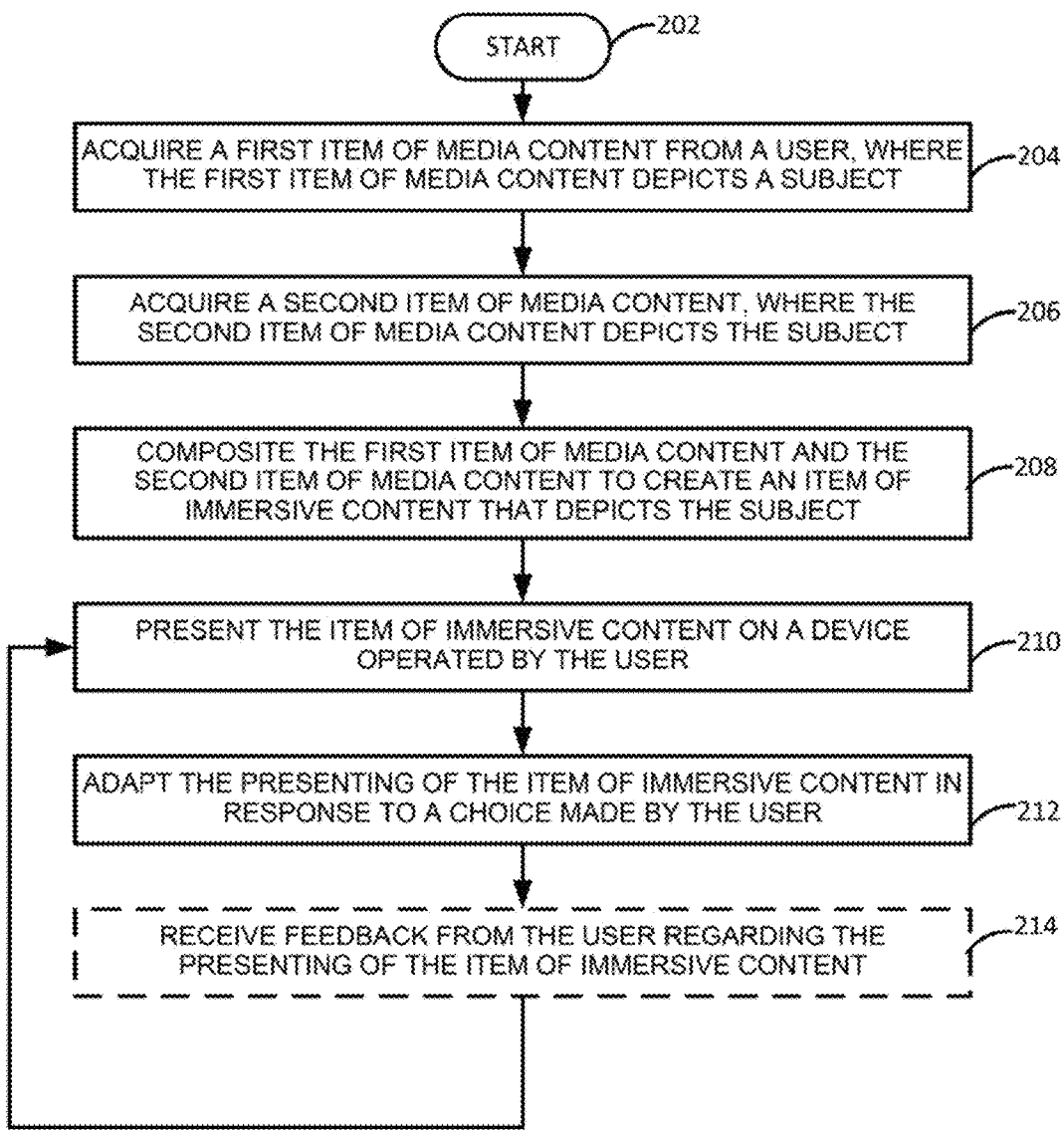
FIG. 2 illustrates a flowchart of an example method for compositing non-immersive media content to generate adaptable, immersive content in accordance with the present disclosure.

In one example, access network 122 may include an edge server 108, which may comprise a computing system or server, such as computing system 300 depicted in FIG. 3, and may be configured to provide one or more operations or functions for compositing non-immersive media content to generate adaptable, immersive content, as described herein. For instance, an example method 200 for compositing non-immersive media content to generate adaptable, immersive content is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., a user endpoint device 112, and access network 122 may be in communication with one or more devices, e.g., a user endpoint device 114. Access networks 120 and 122 may transmit and receive communications between server 110, user endpoint devices 112 and 114, application server (AS) 104, other components of network 102, devices reachable via the Internet in general, and so forth. In one example, the user endpoint devices 112 and 114 may comprise mobile devices, cellular smart phones, wearable computing devices (e.g., smart glasses, virtual reality (VR) headsets or other types of head mounted displays, or the like), laptop computers, tablet computers, or the like (broadly "XR devices").

In one example, user endpoint devices 112 and 114 may comprise a computing system or device, such as computing system 300 depicted in FIG. 3, and may be configured to provide one or more operations or functions in connection with examples of the present disclosure for compositing non-immersive media content to generate adaptable, immersive content.

In one example, server 110 may comprise a network-based server for generating XR environments. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an XR system operated by an entity that is not a telecommunications network operator. For instance, a provider of an XR system may operate server 110 and may also operate edge server 108 in accordance with an arrangement with a telecommunication service provider offering edge computing resources to third-parties. However, in another example, a telecommunication network service provider may operate network 102 and access network 122, and may also provide an XR system via AS 104 and edge server 108. For instance, in such an example, the XR system may comprise an additional service that may be offered to subscribers, e.g., in addition to network access services, telephony services, traditional television services, and so forth.

In an illustrative example, an XR system may be provided via AS 104 and edge server 108. In one example, a user may engage an application on user endpoint device 112 (e.g., an "XR device") to establish one or more sessions with the XR system, e.g., a connection to edge server 108 (or a connection to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 112 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 112 may communicate with access network 122, network 102, the Internet in general, etc., via a WLAN that interfaces with access network 122.

In the example of FIG. 1, user endpoint device 112 may establish a session with edge server 108 for accessing or joining or generating an XR environment. As discussed above, the XR environment may be generated by compositing an item of non-immersive content with one or more other items of (immersive or non-immersive) content to produce an item of immersive content. The item of immersive content may, for instance, provide a rendering of a subject that is viewable from multiple different perspectives, that is interactive, that allows for multiple possible branches or paths of exploration, or that may be modified to depict an appearance associated with a specific time, event, season, location, or the like.

As an example, consider the tower lights at the top of the Empire State Building in New York City. Throughout the year, the tower lights are illuminated at night in different colors to commemorate different holidays and events (e.g., green for St. Patrick's Day, red, white, and blue for Independence Day, etc.). In the example illustrated in FIG. 1, the AS 104 may acquire from a user a still image 116 of the Empire State Building at night and illuminated in multiple colors. In addition, the AS 104 may acquire from a database a first volumetric video 118 which depicts the Empire State Building during the day (i.e., unlit). For instance, the first volumetric video 118 may comprise a professionally produced volumetric video which allows users to remotely "explore" the Empire State Building. The AS 104 may composite the still image 116 and the first volumetric video 118 to generate a new, second volumetric video 124 which depicts the Empire State Building at night and lit in the colors shown in the still image 116. According to this example, the second volumetric video 124 may be considered an item of "living" content which may be updated through compositing with additional items of content to constantly present an up to date appearance of the Empire State Building at night.

In other examples, the AS 104 may composite multiple items of non-immersive content to produce an item of immersive content (e.g., compositing multiple still images of the Empire State Building, captured from different perspectives, to generate an XR version of the Empire State Building which may be explored from multiple perspectives). In another example, the AS 104 may composite items of non-immersive content with other items available in the metaverse to augment the metaverse itself (e.g., creating a new persistent item from the items of non-immersive content), to reuse a reference from the metaverse (e.g., identifying the unique changes in appearance or meaning of the reference in the metaverse as a means of creating a compressed representation), or to act as an exclusion of the metaverse (e.g., suppressing the metaverse graffiti or an item controlled by third-party intellectual property from showing up in a store owner's business).

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of a method 200 for compositing non-immersive media content to generate adaptable, immersive content in accordance with the present disclosure. In particular, the method 200 provides a method by which an extended reality environment may be rendered by compositing data from a plurality of different data sources. In one example, the method 200 may be performed by an XR server that is configured to generate XR environments, such as the AS 104 or server 110 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may acquire a first item of media content from a user, where the first item of media content depicts a subject. In one example, the first item of media content may comprise a "seed" for compositing multiple items of content into an item of immersive content, as discussed in greater detail below.

In one example, the first item of media content may comprise audio, video, still images, or any combination of audio, video, and still images. The subject depicted in the first item of media content may be a geographic location (e.g., a city), a landmark or other venues (e.g., a monument, a museum, a stadium, an office building, etc.), a vehicle, or the like. In one example, the media content may further depict an event related to the subject (e.g., a tour of a museum exhibit, a game or concert taking place in a stadium, a ride on a train, etc.).

In one example, the first item of media content may comprise amateur (i.e., not professionally produced) content. For instance, the first item of media content may comprise media content that was captured by a media capture device (e.g., a camera, a microphone, and/or the like, or a device incorporating a camera, microphone, and/or the like such as a smart phone or tablet computer) operated by the user. The first item of media content may be stored as personal media of the user, such that the first item of media content may be stored in association with a profile or account of the user, and the user may select whether or not to make the first item of media content accessible to other users. For instance, the first item of media content may be stored locally on the user's media capture device as well as remotely on a server associated with the user's remote storage account, social media account, or the like. In one example, if the user consents, the first item of media content may also be published to a public database where the first item of media content may be accessible by a processing system for compositing content for other users.

In one example, the first item of media content may be annotated with metadata describing the subject depicted in the first item of media content, the location depicted in or otherwise associated with the first item of media content, the activity depicted in the first item of media content, other users who were detected (e.g., based on signals emitted by their mobile phones or other devices, or based on the users "checking in" on a software application) to be within a predefined radius of the location when the first item of media content was captured, and/or other information about the first item of media content. In one example, the metadata may comprise metadata that is automatically added by the user's media capture device and/or metadata that is manually added by the user.

In step 206, the processing system may acquire a second item of media content, where the second item of media content depicts the subject. Like the first item of media content, the second item of media content may comprise audio, video, still images, or any combination of audio, video, and still images. The second item of media content may depict the subject from a different perspective than the first item of media content (e.g., from a different viewing angle) or at a different time than the first item of media content (e.g., 20 years earlier, during a different season of the year, during a notable event, etc.)

In one example, the second item of media content may comprise professionally produced media content, e.g., from a media studio or the like. However, in another example, the second item of media content could comprise amateur content (e.g., from the same user or from a different user who has granted access to their media content). Where the second item of media content comprises professionally produced media content, the professionally produced media content may or may not be produced explicitly for the purpose of compositing new media content. For instance, the professionally produced media content may comprise a scene of a film, a television show, or a video game that depicts the subject (as described above).

Like the amateur produced content, the professionally produced content may be annotated with metadata describing the subject depicted in the second item of media content, the location depicted in or otherwise associated with the second item of media content, the activity depicted in the second item of media content, other users who were detected to be within a predefined radius of the location when the second item of media content was captured, and/or other information about the second item of media content.

Thus, in one example, the second item of media content may be acquired by searching a database or pool of media content for a second item of media content whose metadata matches the metadata associated with the first item of media content (e.g., matching subject or location tags) or matches a search keyword. Similar to the metadata associated with the first item of media content, the metadata associated with the second item of media content may be added automatically and/or manually.

In another example, the second item of media content may be acquired by detecting the subject's presence in both the first item of media content and the second item of media content. For instance, the processing system may perform one or more image analysis techniques (e.g., object segmentation, object recognition, facial recognition, text or character recognition, etc.) in order to detect the subject in the first item of media content. The processing system may then perform similar analysis techniques on a pool of media content in order to identify the second item of media content which also depicts the same subject.

In one example, the processing system may recommend the second item of media content to the user, along with one or more other candidate items of media content which are believed to depict the subject. The user may then select the second item of media content from among the candidate items of media content identified by the processing system. Recommendation of a candidate item of media content may be based on more than depiction of the same subject. For instance, in one example, the processing system may consider additional factors such as recommendation by other users, use in prior items of immersive content, and any policies associated with the candidate items of media content when recommending candidate items of media content to the user.

In one example, a policy associated with the second item of media content may control when and how the second item of media content can be used to composite new items of immersive content. The policy may specify, for example, when branded content can be included in immersive content that utilizes the second item of media content, any events whose occurrence should trigger compositing of the second item of media content with other items of media content, and the like. The policy may be defined by the owner of the second item of media content (e.g., a user who holds the copyright or other rights in the second item of media content).

In step 208, the processing system may composite the first item of media content and the second item of media content to create an item of immersive content that depicts the subject. In one example, the item of immersive content may be rendered as an extended reality (XR) environment. In another example, item of the immersive content may reference the metaverse as an item to be persistent, as an adaptation of an item in the metaverse, or as an exclusionary indicator for items in the metaverse.

In one example, the XR environment may be rendered by compositing multiple views of the subject, captured from different perspectives (e.g., at least a first perspective and a second perspective) and stitched together (e.g., using photogrammetry or similar techniques), to generate an immersive view of the subject. For instance, where the subject is a famous landmark, multiple still and/or video images of the landmark from different perspectives may be stitched together to generate a 360 degree or a volumetric video of the landmark. The 360 degree or volumetric video of the landmark may allow a user to move through the XR environment in any direction and to view the landmark from any perspective, as might be possible if the user were physically present at the landmark. Audio, tactile, olfactory, and/or other effects may be incorporated into the XR environment as well. For instance, if the XR environment presents a beach location, audio effects (e.g., generated by a speaker) may include the sounds of waves and seagulls, tactile effects (e.g., generated by an Internet connected thermostat or lighting system) may include an increase in ambient temperature and/or brightness, and olfactory effects (e.g., generated by an olfactory stimulation system) may include the scent of saltwater, food scent associated with beach boardwalk food vendors, and the like.

In step 210, the processing system may present the item of immersive content on a device operated by the user. Presentation of the item of immersive content may involve presenting portions of the item of immersive content that correspond to a user's current position and/or field of view within the XR environment. For instance, the presentation may render objects that are within the user's current field of view while not rendering (or potentially caching for quicker access) objects that are not within the user's current field of view).

In one example, the processing system may tailor the presentation to the capabilities of the device and/or to the user's current use context. For instance, the appearance of the immersive content may vary depending on the display capabilities (e.g., two-dimensional, three-dimensional, volumetric, 360 degree, etc.) of the device. In addition, the inclusion of additional sensory effects (e.g., tactile, olfactory, etc.) may depend on whether the device is capable of producing those effects (or capable of communicating with a proximate device that can produce the effects). In another example, the appearance of the immersive content (e.g., the resolution, refresh rate, or the like) may be tailored to the connectivity (e.g., signal strength, bandwidth, latency, etc.) of the device. In a further example, if the user is walking or moving while experiencing the immersive content, the processing system may present alerts to the user (e.g., visible alerts, audible alerts, or other types of alerts) to let the user know when they may be about to collide with an object in the real world.

In one example, the presentation of the item of immersive content may include presenting an indication to the user when a different perspective of the subject or of the XR environment is available. For instance, the XR environment may include an intersection of two streets. The processing system may present a visual (or other type of) indicator at the intersection to inform the user that it is possible to proceed straight through the intersection, to turn right, and/or to turn left. In this case, the processing system may have access to content which can be used to render a view of the subject which is true to perspective regardless of which direction the user chooses while moving through the intersection. For instance, if the two streets are two real streets in a city, the processing system may have access to still and/or video images of the buildings, landmarks, signage, and the like that would be visible if the user proceeds straight through the intersection, turns right, or turns left. In a further example, the indicator may provide some information as to what types of objects may be available (for viewing and/or interaction) if the user elects to proceed in a certain direction. For instance, an indicator may comprise a sign that reads "This way to the hidden fair" or "Go left to find Person A." In another example, an indicator may provide information as to different time perspectives that are available for a corresponding location (e.g., view this street in summer, in winter, twenty years in the past, during a parade, etc.). This may allow a user to experience an event that they may have missed at the location.

In step 212, the processing system may adapt the presenting of the item of immersive content in response to a choice made by the user. In one example, adaptation of the presentation may involve monitoring the user's continual progress through the item of immersive content and responding to user actions or cues that may trigger changes.

For instance, in one example, adaptation of the item of immersive content may comprise acquiring a third item of media content (where the third item of media content may depict the subject or may depict another person, place, or thing, that is within the user's current view in the XR environment) and compositing the third item of media content with the item of immersive content. This may provide an option for the user to choose an experience that was not part of the item of immersive content prior to the compositing with the third item of media content. For instance, as discussed above, the user may arrive at an intersection within the XR environment and may choose to turn left at the intersection. The processing system may then acquire one or more items of content depicting the buildings, landmarks, signage, and the like that would be visible if the user turned left at the real-world equivalent of the intersection and may composite these one or more items of content to extend the item of immersive content. In another example, adaptation of the item of immersive content may be triggered by the user interacting with an object in a specific way (e.g., touching a specific object or manipulating the object in a certain way may cause the user's location within the XR environment to change). In another example, adaptation of the immersive content may comprise inserting a bookmark or other marker in response to a user request, so that the user may "jump" directly to a specific portion of the item of immersive content during a subsequent experience.

In optional step 214 (illustrated in phantom), the processing system may receive feedback from the user regarding the presenting of the item of immersive content. In one example, the user feedback may comprise explicit feedback (e.g., in the form of the user selecting an option to "like" or "dislike" or recommend the item of immersive content or a particular aspect of the item of immersive content). In another example, the user feedback may comprise a more implicit measure of user engagement (e.g., tracking for how long the user's gaze is fixed on a point in the XR environment, tracking how many objects the user has interacted with in the XR environment within a window of time, etc.), if the user consents to data about such engagement being collected.

The user feedback may be used to identify items of immersive content that are trending (e.g., have seen the greatest increase in uses over a defined period of time as compared to other items of immersive content), that are most popular, that are declining in popularity, that have been replayed the most number of times, and the like. This information may be used to recommend items of immersive content to users.

The method may return to step 210 and may continue to present the item of immersive content as described above (including adapting the presenting as appropriate and optionally acquiring user feedback) until a signal is received that indicates that the user wishes for the processing system to cease presenting the item of immersive content. For instance, the user may power down their device, may speak a command or press a button to exit the XR environment, or the like.

In one example, the processing system may record the user's progress through the item of immersive content, including any objects with which the user may interact, any choices which the user may make that may trigger adaptations of the item of immersive content, and any feedback provided by the user. This may allow the user to play their experience with the item of immersive content back at a later time, or potentially to make different actions or choices within the playback. The recording may also allow the processing system to infer user preferences, such as whether the user prefers certain settings (e.g., amusement park versus beach), actions (e.g., revisiting a movie versus revisiting a vacation), or the like.

In one example, items of immersive content which are composited according to the method 200 may be used to "gamify" user experiences. For instance, a user may be incentivized to interact with an item of immersive content by awarding the user points, unlocking new experiences or objects, or providing other rewards for achieving certain goals with respect to the item of immersive content (e.g., interacting with the item of immersive content for a threshold period of time, exploring a threshold number of areas within the XR environment or interacting with a threshold number of objects in the XR environment, receiving a threshold number of positive reactions from other users, performing specified tasks, etc.).

As an example, an item of immersive content may comprise an XR environment depicting a biking trail in a forest. The XR environment could be composited from multiple still and/or video images of the biking trail and surrounding forest. Multiple users could compete (e.g., via stationary bicycles and head mounted displays) in a race along the biking trail. Other experiences may also be provided in the XR environment, such as the ability to jump obstacles or explore different branches of the biking trail.

The ability to detect and composite new items of content into an item of immersive content may also enhance gamification by allowing continuous branching of the item of immersive content. For instance, newly acquired content can be continuously acquired and used to provide opportunities for new experiences in the item of immersive content, such as selecting an alternate path at a point where the item of immersive content may provide more than one potential path.

Examples of the present disclosure may also be used to create "living" content. For instance, a real world physical environment (e.g., a city, a landmark, a tourist attraction, etc.) may be captured and depicted in at item of immersive content that is composited according to the method 200. Later captured content depicting the same real world environment could be used to update the item of immersive content, so that the item of immersive content is more true to the current state of the real world physical environment. For instance, an item of immersive content may depict a beach scene in the summer and later be updated using content that depicts the beach scene in the winter with snow. A museum curator could capture content that depicts a new museum exhibit and use the content to update an item of immersive content that depicts the interior of the museum (e.g., a virtual museum tour). For example, a shop owner could capture content of a new store display or remodel and use the content to update an item of immersive content that depicts the store (e.g., a virtual online store). In another example, a homeowner or contractor could capture content of a new home construction or redecoration project and use the content to update an item of immersive content that depicts the home (e.g., a virtual real estate walk through).

In further examples, two or more users may simultaneously experience the same item of immersive content. In this case, examples of the present disclosure may bookmark or make a record of points in the item of immersive content where the two or more users shared an experience, so that the two or more users may at any time "jump" to that experience in the item of immersive content. A single user could also experience an item of immersive content as a way of re-living an experience in the real world, where still or video images of the experience in the real world may have been used to composite the item of immersive content. In this case, the item of immersive content may also utilize additional content from other sources (e.g., maps, social media, object model libraries, etc.) to augment or enhance the experience.

As an example, an item of immersive content may comprise an XR environment derived from a scene of a movie which takes place in a foreign city. The scene from the movie may be composited with live video footage from the foreign city (e.g., depicting current weather conditions, a current event taking place in the foreign city, or the like) or with still or video images captured by users who have visited the foreign city in person (e.g., video footage of a walking tour, a family dinner, or the like). This may allow users to experience portions of the foreign city that they may have missed experiencing when they visited in person. Alternatively, a user's personal footage of the foreign city could be composited with a scene from a movie that occurs in the foreign city, giving the user the ability to re-experience the foreign city with the option to integrate commercial content (e.g., reliving a family dinner with a car chase in the background). The experience could be gamified by challenging users to visit a set of locations within the foreign city, similar to a scavenger hunt.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for compositing non-immersive media content to generate adaptable, immersive content, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for compositing non-immersive media content to generate adaptable, immersive content may include circuitry and/or logic for performing special purpose functions relating to the operation of a home gateway or XR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for compositing non-immersive media content to generate adaptable, immersive content (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for compositing non-immersive media content to generate adaptable, immersive content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
acquiring, by a processing system including at least one processor, a first item of media content from a user, where the first item of media content depicts a subject at a first time;
acquiring, by the processing system, a second item of media content, where the second item of media content depicts the subject at a second time that is different from the first time;
compositing, by the processing system, the first item of media content and the second item of media content to create, within a metaverse of immersive content, an item of immersive content that depicts the subject;
presenting, by the processing system, the item of immersive content on a device operated by the user; and
adapting, by the processing system, the presenting of the item of immersive content in response to a choice made by the user.

2. The method of claim 1, wherein each of the first item of media content and the second item of media content comprises at least one of: an audio, a video, or a still image.

3. The method of claim 1, wherein the first item of media content comprises an amateur produced content, and the second item of media content comprises a professionally produced content.

4. The method of claim 3, wherein the first item of media content is captured by a media capture device operated by the user and stored in association with an account of the user.

5. The method of claim 3, wherein a policy associated with the second item of media content controls when and how the second item of media content is to be used to composite a new item of immersive content.

6. The method of claim 5, wherein the policy further controls when a branded content is to be included in the new item of immersive content that utilizes the second item of media content.

7. The method of claim 5, wherein the policy specifies an event whose occurrence should trigger compositing of the second item of media content with other items of media content.

8. The method of claim 1, wherein the first item of media content and the second item of media content are matched for the compositing based on matching metadata associated with the first item of media content and the second item of media content.

9. The method of claim 8, wherein the metadata describes at least one of: the subject, a location depicted in one of the first item of media content or the second item of media content, an activity depicted in one of the first item of media content or the second item of media content, or another user who was detected to be within a predefined radius of the location.

10. The method of claim 1, wherein the first item of media content depicts the subject from a first perspective and the second item of media content depicts the subject from a second perspective that is different from the first perspective.

11. The method of claim 10, wherein the compositing comprises utilizing a photogrammetry technique to stitch the first perspective and the second perspective.

12. The method of claim 1, wherein the compositing comprises altering an appearance of the subject in the item of immersive content to match one of: an appearance of the subject at the first time or an appearance of the subject at the second time.

13. The method of claim 1, wherein the first item of media content and the second item of media content are matched for the compositing based on an image analysis technique that detects the subject in both the first item of media content and the second item of media content.

14. The method of claim 1, wherein the presenting includes presenting an indication to the user when a different perspective of the subject is available in the item of immersive content.

15. The method of claim 1, wherein the adapting comprises compositing a third item of media content with the item of immersive content.

16. The method of claim 15, wherein the compositing the third item of media content with the item of immersive content provides an option for the user to choose an experience that was not part of the experience prior to the compositing with the third item of media content.

17. The method of claim 1, further comprising recording a progress of the user through the item of immersive content for later playback.

18. A non-transitory computer-readable medium storing instructions which, when executed by a processing system including at least one processor, cause the processing system to perform operations, the operations comprising:
    acquiring a first item of media content from a user, where the first item of media content depicts a subject at a first time;
    acquiring a second item of media content, where the second item of media content depicts the subject at a second time that is different from the first time;
    compositing the first item of media content and the second item of media content to create, within a metaverse of immersive content, an item of immersive content that depicts the subject;
    presenting the item of immersive content on a device operated by the user; and
    adapting the presenting of the item of immersive content in response to a choice made by the user.

19. A device comprising:
    a processing system including at least one processor; and
    a computer-readable medium storing instructions which, when executed by the processing system, cause the processing system to perform operations, the operations comprising:
        acquiring a first item of media content from a user, where the first item of media content depicts a subject at a first time;
        acquiring a second item of media content, where the second item of media content depicts the subject at a second time that is different from the first time;
        compositing the first item of media content and the second item of media content to create, within a metaverse of immersive content, an item of immersive content that depicts the subject;
        presenting the item of immersive content on a device operated by the user; and
        adapting the presenting of the item of immersive content in response to a choice made by the user.

20. The method of claim 1, wherein the first time and the second time comprise at least one of: different years, different seasons, or different holidays.

* * * * *